Patented Feb. 17, 1931

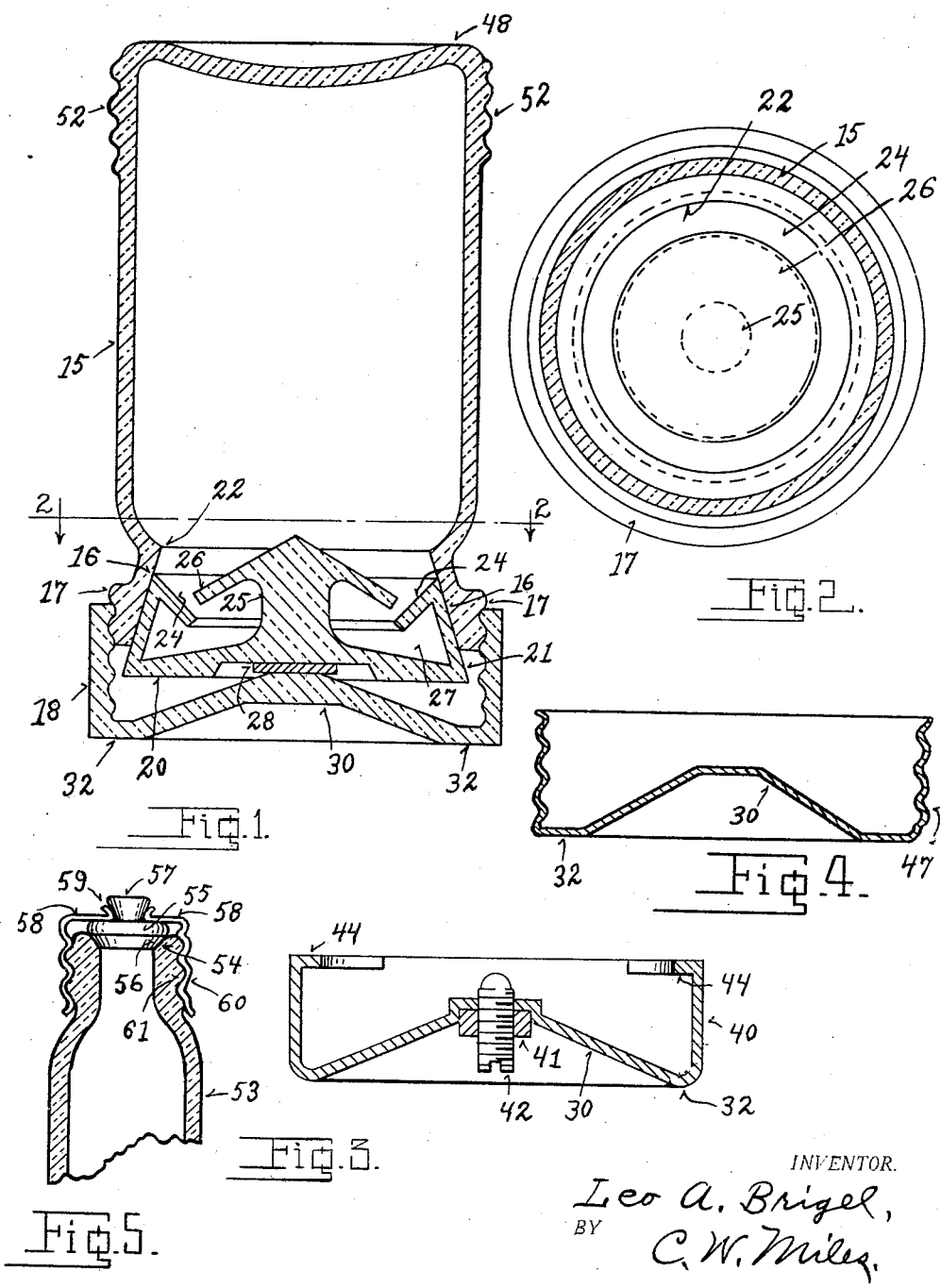

1,793,048

UNITED STATES PATENT OFFICE

LEO A. BRIGEL, OF CHEVIOT, OHIO

CONTAINER AND LID

Application filed April 5, 1928. Serial No. 267,739.

My invention relates to improved container for the preservation of fruits, vegetables, cider and similar food and beverage substances. One of its objects is to provide an improved means of sealing the container. Another object is to provide an improved stopper adapted for use as a bottle or jar stopper. Another object is to provide for settling out from clear or transparent substances any opaque substances or sediments and trapping the same within the lid, so that upon removal of the lid the opaque substance or sediment is removed with the lid and separated from the contents of the container. Another object is to provide for inverting the containers so that any leakage which may occur will be that of a liquid leaking outwardly in place of a gas leaking inwardly and carrying therewith the spores or germs with which to set up a fermentation or other growth within the container. Another object is to provide improved means to retain the lid in place until it is desired to remove the lid. My invention also comprises certain details of form and arrangement and combination of components, all of which will be fully set forth in the description of the accompanying drawings, in which:

Fig. 1 is a central vertical section through a closed container in an inverted position and embodying my invention.

Fig. 2 is a horizontal section taken on line 2—2 of Fig. 1.

Fig. 3 is a central vertical section through a metal retaining cap detached and representing a modification.

Fig. 4 is a central vertical section through a metal retaining cap detached and representing another modification.

Fig. 5 illustrates a modification applied as a bottle stopper.

The accompanying drawings illustrate modifications of my invention in Figs. 1 and 2 of which 15 represents a fruit jar or similar container preferably of glass or porcelain ware. The mouth of the jar is of nearly as great diameter as that of the jar, and is tapered outwardly, and preferably has a truly tapered ground face. The exterior of the jar at the mouth may be provided with a spiral thread 17 to be engaged by corresponding threads of a retaining cap 18, or the cap 18 may be engaged to the mouth of the container by segmental spirals or threads, or by any other known means employed to hold the cap members in place relative to the containers. As shown in Fig. 1, the cap member is designed to be constructed of glass, porcelain or of metal, by a die casting operation for instance, while in the modifications shown in Figs. 3 and 4, the cap members are designed to be stamped or drawn from sheet metal.

The lid 20 is preferably constructed from glass or porcelain and is provided with a conical ground face 21 to form a ground joint with the face, or mouth 16 of the container. The diameter of the conical face 21 of the lid is such that the lid does not enter entirely into the mouth, of the container as shown in Fig. 1, which provided for grinding the faces 16 and 21 by chucking the container and lid separately and rotating them and then grinding the faces 16 and 21 each accurately to a prescribed angle, whereby the lids and containers may be mated interchangeably. In grinding the faces 16 the grinding tool is fed past the neck 22 or narrowest portion of the jar, to insure a true taper to the entire face 16. The lid 20 is preferably molded with an annular tapered and inwardly directed ledge 24 to direct any sediment which may settle upon the lid from the contents of the container toward the center of the lid. A central pedestal 25 also carries an outwardly tapered head 26 which directs any sediment settling from the contents of the container outwardly and downwardly until it enters between the inner edge of the ledge 24 and the outer edge of the head 26 into an annular recess 27 which forms a trap to retain any sediment deposited therein and permits the lid to be removed carrying the sediment therewith. A disk of fiber or soft rubber 28 is interposed between the lid 20 and the central depressed portion 30 of the cap member, whereby the cap member is enabled to exert pressure upon the lid to hold the lid firmly in place and the ground joint effectively sealed. The shape of the cap member is such that the depressed portion 30 is practically rigid and unyielding to pressure exerted thereon through the disk 28. The flat annular face 32 of the cap affords a true broad and stable support for the container in an inverted position. If desired the cap may be formed from glass or porcelain, thereby providing a container in which all the parts are of non-corrosive material, adapted to be kept clean and readily sterilized. Any sediment settling along the inner face of the container walls will be deflected by the rib 22 inwardly so as to be trapped in the lid. A thread 52 is preferably formed at the bottom of the container to which the cap 18 is adapted to be threaded to keep the empty container and cap together.

In the modification of Fig. 3, I have shown a sheet metal cap member 40 having a boss 41 located centrally thereof and a set-screw 42 threaded through the boss 41 and adapted to be turned by a screw driver or wrench to cause the screw 42 to engage the fiber disk 28 and thereby hold the lid 20 firmly to its ground joint seat 16 to close the container. Inturned lugs 44 are shown to engage corresponding lugs upon the exterior of the mouth of the container before the screw 42 is tightened. The cap 40 may be held to the container by screw threads as shown in Fig. 1 if desired.

In the modification Fig. 4, I have shown a cap member 47 similar to the cap shown in Fig. 1, but formed from sheet metal, and adapted to be operated in the same manner as the cap of Fig. 1.

To make use of the container it is first filled to about the ledge 22 with the substance to be preserved while resting upon its bottom 48. The lid 20 is then adjusted to position, the disk 28 placed in position, and the cap 18 adjusted to position and tightened to lock the lid in place upon the mouth of the container. The container is then preferably inverted so as to rest upon the annular face 32, which causes the leakage, if any, to be of a liquid outward, and prevents any air leaking into the container, should there be any leakage at all, and hence no germs or spores could gain access to the container. In the event of a sediment settling out of the liquid contents of the container, this sediment finds its way to the annular chamber 27 of the lid, where it is trapped. When it is desired to open the container it is carefully and slowly turned right side up, and the cap removed, and then the lid removed carrying the sediment with it.

In Fig. 5 I have illustrated my improvement applied as a stopper to any ordinary bottle 53 having a ground face 54 at the mouth of the bottle. A stopper or lid 55 corresponding to the lid 20 of Fig. 1 is of glass or porcelain and has a ground face 56 to engage the ground face 54 and form a tight joint therewith. The stopper is provided with a tapered stem 57 which passes through a central perforation 59 in the metal cap 58 corresponding to the cap 18 of Fig. 1. After the stem 57 has entered the perforation 59, the metal of the cap is forced toward the center of the cap and stem into the neck or recess between the head of the stem and the stopper, so as to lock the stopper to the cap. The cap is provided with threads 60 to engage threads 61 formed on the exterior of the mouth of the bottle. The cap is rotatable upon the stem of the stopper, so that the stopper need not rotate when the cap is being screwed upon the threads 61 of the bottle. When the cap is unscrewed from the threads 61, the stopper is lifted away from the mouth of the bottle by the cap. The lid and cap shown in Fig. 1 may be united if desired in substantially the same manner shown in Fig. 5.

The apparatus herein shown and described is capable of considerable modification within the scope of the claims without departing from the principle of my invention.

What I claim is:—

1. A seal for jars or the like comprising a container having a mouth, a closure therefor, said closure having an inwardly extended flange forming a sediment trap, and means for detachably holding said closure in sealing engagement with said mouth.

2. A seal for jars, or the like comprising a container having a mouth, a closure therefor, said closure including a flange having an overhanging concentric lip forming a sediment trap, and means for detachably holding said closure in sealing engagement with said mouth.

3. A seal for jars or the like comprising a container having a mouth, a closure therefor, said closure including a flange having an overhanging concentric lip, a projection centrally of said closure having a tapered head overlying and stopping closely adjacent said flange forming a sediment trap, and means for detachably holding said closure in sealing engagement with said mouth.

In testimony whereof I have affixed my signature.

LEO A. BRIGEL.